US012676475B2

(12) United States Patent
Giessler et al.

(10) Patent No.: US 12,676,475 B2
(45) Date of Patent: Jul. 7, 2026

(54) ELECTRICAL POWER SUPPLY SYSTEM

(71) Applicant: Siemens Aktiengesellschaft, Munich (DE)

(72) Inventors: Folke Giessler, Lisberg (DE); Oliver Reimann, Erlangen (DE)

(73) Assignee: Innomotics GmbH, Nuremberg (DE)

( * ) Notice: Subject to any disclaimer, the term of this patent is extended or adjusted under 35 U.S.C. 154(b) by 416 days.

(21) Appl. No.: 18/016,076

(22) PCT Filed: Jul. 15, 2021

(86) PCT No.: PCT/EP2021/069688
§ 371 (c)(1),
(2) Date: Jan. 13, 2023

(87) PCT Pub. No.: WO2022/013330
PCT Pub. Date: Jan. 20, 2022

(65) Prior Publication Data
US 2023/0283071 A1     Sep. 7, 2023

(30) Foreign Application Priority Data

Jul. 17, 2020    (EP) .................................... 20186513

(51) Int. Cl.
*H02M 7/219*        (2006.01)
*H02J 1/102*        (2026.01)
           (Continued)

(52) U.S. Cl.
CPC ............ *H02J 1/102* (2013.01); *H02J 3/0073* (2020.01); *H02M 7/219* (2013.01); *H02P 3/02* (2013.01);
           (Continued)

(58) Field of Classification Search
CPC ...... H02J 3/36; H02J 3/381; H02J 3/46; H02J 3/32; H02J 9/062; H02J 9/061; H02J 9/06
See application file for complete search history.

(56) References Cited

U.S. PATENT DOCUMENTS

2009/0261599 A1*  10/2009  Alston ...................... H02P 9/04
                                                             290/40 B
2014/0313795 A1*  10/2014  Mi ......................... H02M 1/126
                                                             333/167
(Continued)

FOREIGN PATENT DOCUMENTS

CN          101958674 A       1/2011
DE        102011053982 A1     3/2013
WO      WO 2020070201 A1      4/2020

OTHER PUBLICATIONS

PCT International Search Report mailed Aug. 10, 2021 corresponding to PCT International Application No. PCT/EP2021/069688 filed Jul. 15, 2021.

*Primary Examiner* — Bryan R Perez
(74) *Attorney, Agent, or Firm* — Henry M. Feiereisen LLC

(57) ABSTRACT

An electrical power supply system, in particular for a microgrid, includes a DC bus, and a first rectifier and a second rectifier, with the first and second rectifiers each supplying power to the DC bus. The first rectifier is a diode rectifier and the second rectifier has switchable power semiconductors. The electrical power supply system further includes a generator supplying power to both rectifiers. The rectifiers can be connected at different times according to a load.

16 Claims, 4 Drawing Sheets

(51) Int. Cl.
 *H02J 3/0073*   (2026.01)
 *H02P 3/02*    (2006.01)
 *H02J 105/30*   (2026.01)
 *H02P 103/10*   (2016.01)
 *H02P 103/20*   (2016.01)

(52) U.S. Cl.
 CPC ....... *H02J 2105/31* (2026.01); *H02P 2103/10*
     (2015.01); *H02P 2103/20* (2015.01)

(56)      References Cited

U.S. PATENT DOCUMENTS

| | | |
|---|---|---|
| 2017/0133858 A1 | 5/2017 | Pan |
| 2019/0047433 A1* | 2/2019 | Rozman ................ B60W 20/00 |

* cited by examiner

ELECTRICAL POWER SUPPLY SYSTEM

CROSS-REFERENCES TO RELATED APPLICATIONS

This application is the U.S. National Stage of International Application No. PCT/EP2021/069688, filed Jul. 15, 2021, which designated the United States and has been published as International Publication No. WO 2022/013330 A1 and which claims the priority of European Patent Application, Serial No. 20186513.6, filed Jul. 17, 2020, pursuant to 35 U.S.C. 119 (a)-(d).

BACKGROUND OF THE INVENTION

The invention relates to an electrical power supply system for use particularly in a microgrid. An example of a microgrid is a ship, a drilling rig, a production platform, etc.

To supply electrical power in the microgrid e.g. at least one diesel (diesel engine) and/or gas turbine is provided which can be used to drive an electrical generator. The electrical generator is e.g. an asynchronous generator or a synchronous generator. A synchronous generator can be externally excited or self-excited. A permanently excited synchronous machine is a self-excited machine. The synchronous machine can be used both as a generator and as a motor. This also applies to the asynchronous machine. In a microgrid, the electrical power can be distributed/transmitted via a DC bus. The DC bus can be supplied by means of at least one rectifier. The rectifier or rectifiers receive the electrical power from the one or more generators which can be driven e.g. by a diesel engine or a gas turbine.

The electrical power supply system can be improved, for example, in respect of manufacturing cost and/or weight and/or operational reliability. In this context, one or more rectifiers for asynchronous machines/synchronous machines may be found. This rectifier must provide a constant DC link voltage, in particular at different diesel engine speeds. The different diesel engine speeds are required in order to run the diesel engine in a speed range with an optimum consumption curve even at partial load. A problem of this kind can arise in particular with diesel-electric marine propulsion systems with a DC link.

An object of the invention is to indicate an improved system for supplying electrical power, this relating hi particular to a microgrid, in particular an electrical power supply system on a ship.

SUMMARY OF THE INVENTION

This object is achieved by an electrical power supply system as set forth hereinafter and by a method for operating an electrical power supply system as set forth hereinafter. Embodiments of the invention will emerge, for example from the dependent claims respectively.

An electrical power system, in particular for a microgrid, wherein the microgrid is on a ship, comprises a DC bus, wherein the DC bus is segmentable, or segmented, wherein a first rectifier and a second rectifier are provided for supplying the DC bus. The first rectifier is a diode rectifier and the second rectifier is a switchable rectifier, i.e. comprises switchable power semiconductors. The diode rectifier has diode power semiconductors. Switchable power semiconductors are IGBTs or thyristors, for example. The DC bus has two segments, i.e. in particular at least two segments, wherein in particular one of the segments (31,32,33) has only one feed (21,22,23,24,25), wherein this single feed is an external feed. An external feed is, for example, one from a wide-area synchronous grid (interconnection) or a feed from a floating facility. This floating facility is locally separate from the DC bus or rather locally separate from equipment on which the DC bus is located. Another example of an external feed is a port power supply for a ship. In particular, segments of the DC bus can be disconnected and/or connected (as the case may be). In particular, switches are provided for this purpose. For example, a switch can be a mechanical or power semiconductor type, and/or be of hybrid design (mechanical and with a power semiconductor). Two segments of the DC bus each have at least one feed. Thus, parts of the DC bus can be operated separately. In particular, a feed can also be provided separately. For example, power can be fed into only one segment, another segment being de-energized, i.e. no power is supplied. This can be advantageous, for example, for ships that are in port or at anchor. For example, repairs or maintenance work can be carried out without the entire microgrid being de-energized. Also, the separate electrical supply (i.e. the corresponding feed) by selectable segments can be advantageous in the event of a particular mode of operation. For example, in a port, a ship with a microgrid can be fed from a port power supply. Also in a port, for example, a feed can be based on an environmentally friendly energy source, such as a diesel engine powered by marine diesel or a gas turbine powered by gas. The first rectifier and the second rectifier can be supplied by means of a generator. The different rectifiers have different advantages and disadvantages. For example, the diode rectifier is inexpensive to manufacture. The switchable rectifier increases flexibility and technical application possibilities.

In one embodiment of the electrical power supply system, the electrical power supply system has a plurality of generators, wherein a first segment of the DC bus can be fed by means of a first generator and a second segment of the DC bus can be fed by means of a second generator, a switch being provided for segmentation. A plurality of switches can also be provided for segmenting two segments. A switch, in particular a switch comprising power semiconductors, can be provided for fast isolation. Another mechanical switch connected in series thereto can be provided for safe mechanical separation. This ensures that different segments can be supplied with electrical power safely isolated from each other, wherein a feed can be selected for this purpose which ensures that loads are safely supplied. If a load (e.g. a propulsion motor for a ship) with a high energy demand is active on the DC bus, a feed comprising a diode rectifier, for example, can be active. If only a small amount of energy is required by loads, only one feed comprising a rectifier with switchable power semiconductors, for example, can be active (i.e. supplying power). This enables the microgrid to be operated efficiently.

In one embodiment, the electrical power supply system has a grid connection, wherein in particular the power supply system can be locally distanced from the grid connection. This relates in particular to a ship with a microgrid, which can be supplied with electrical energy in a port by means of a port power supply and is separated and distanced from the port power supply when underway.

In one embodiment of the electrical power supply system, the generator can be driven by means of a gas turbine or by means of a diesel. Consequently, a gas turbine or a diesel is provided in particular for driving the generator. Thus, the feed for a segment or rather of the segment of the DC bus is based on a diesel and/or on a gas turbine. However, the feed can also be based e.g. on a port power supply. For example, the port power supply is connected to a wide area synchronous grid (interconnection) or itself comprises a diesel or a gas turbine. Both the diesel and the gas turbine (in the microgrid and/or in the port power supply) can be operated in different operating states. These operating states have different efficiencies. By using rectifiers of different types, the system can be better geared to the different operating states or operating points of the diesel or gas turbine.

In one embodiment of the electrical power system, the generator is an asynchronous machine or a synchronous machine, wherein the generator has an open circuit. By using the open circuit (no star point) it is possible to connect two rectifiers to the same generator without connecting them in parallel. Advantageously, these are rectifiers of different types, i.e. in particular a switchable rectifier and a diode rectifier that is not switchable.

In one embodiment of the electrical power supply system, the DC bus is a shipboard DC bus, wherein the ship's motor can be fed via the DC bus. A ship has different loads. One load is the motor or motors for driving one or more propellers. The ship electrical system supply, for example, can also be regarded as a load, wherein the ship electrical system is used, for example, to supply the galley, the control electronics of the air conditioning system, etc. In cruise ships, for example, the load referred to as the hotel load is much larger than the propulsion load for ferries. The different rectifiers can be used to respond to the corresponding expected load distribution of a specific ship.

In one embodiment of the electrical power supply system, different loads can be fed via different segments, in particular separately from each other. Loads include, for example, an electric propulsion motor, an air conditioning system, a galley, a laundry, electrical equipment such as a computer, lighting, etc. The DC bus can be fed in an optimum manner depending on the state and operating conditions of the microgrid and its loads.

In one embodiment of the electrical power supply system, the electrical connection of the generator to the first rectifier and/or to the second rectifier has a filter. This filter can be used to stabilize the DC bus or to improve the quality of the DC voltage in the DC bus.

In one embodiment of the electrical power supply system, the first rectifier has at least ⅓ of the output of the second rectifier and the second rectifier has at least ⅓ of the output of the first rectifier. This range is particularly desirable for ships, as here the propulsion power accounts for a significant portion of the total power.

In one embodiment of the electrical power supply system, the second rectifier comprises an IGBT three-phase bridge. Rectifiers with IGBT three-phase bridges provide a high degree of flexibility.

In one embodiment of the electrical power supply system, the DC bus has a capacitor This capacitor can improve the quality of the DC voltage in the DC bus.

The invention also relates to a method. According to a method for operating an electrical power supply system having a segmented (segmentable) DC bus, wherein in particular switches (in particular a switch) are used to segment the DC bus, i.e. the latter can be segmented, wherein a first rectifier and a second rectifier are provided for supplying the DC bus, wherein the first rectifier is a diode rectifier and the second rectifier has switchable power semiconductors, the rectifiers for supplying the DC bus are switched in at different times depending on a load. Two segments of the DC bus in particular each have at least one feed, wherein the feeds are load-dependent. This is particularly advantageous if different loads arise depending on the operating state of the microgrid. The load is, for example, a hotel load or propulsion load of a ship. Using different types of rectifiers makes it possible to keep the quality of the DC voltage in the DC bus sufficiently high and to reduce the costs associated with the installation and operation of the rectifiers.

In one embodiment of the method, an electrical power supply system of the type already described or described below is used.

BRIEF DESCRIPTION OF THE DRAWING

The invention will now be illustrated and explained in more detail using examples and with reference to the accompanying drawings. The features shown in the figures may be combined by persons skilled in the art to produce new embodiments without departing from the scope of the invention.

DETAILED DESCRIPTION OF PREFERRED EMBODIMENTS

Figure 1:
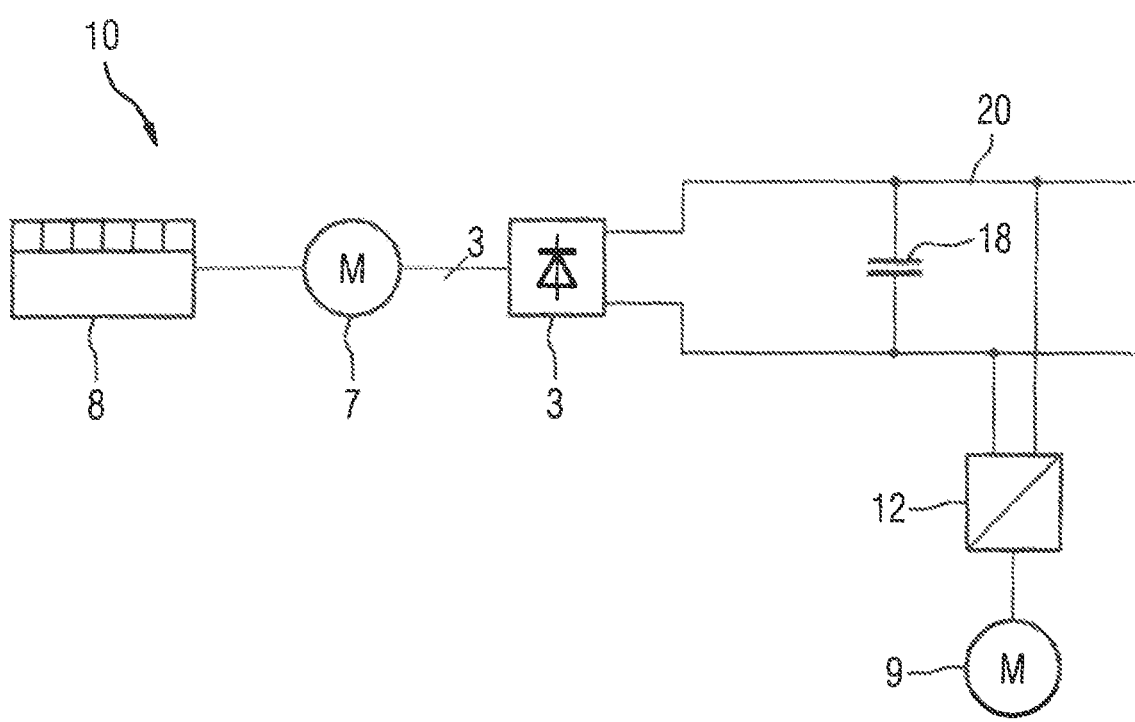
FIG. 1 shows an electrical power supply system with a diode rectifier.

FIG. 1 shows an electrical power supply system 10 with a diode rectifier 3. A generator 7 is driven by a diesel engine (DM) 8. The generator is, for example, a synchronous machine. The generator 7 supplies three-phase power to the diode rectifier 3. The diode rectifier 3, which is an uncontrolled rectifier, supplies the DC bus 20. At full load, i.e. maximum diesel speed, the machine can be in the field weakening region. This DC bus 20, as well as other DC buses, can also be at the same time a DC link. The DC bus 20 has a capacitor 18. By means of an inverter 12 it is possible to draw electrical energy from the DC bus 20 and to drive a motor 9. The motor 9 constitutes a load.

Figure 2:
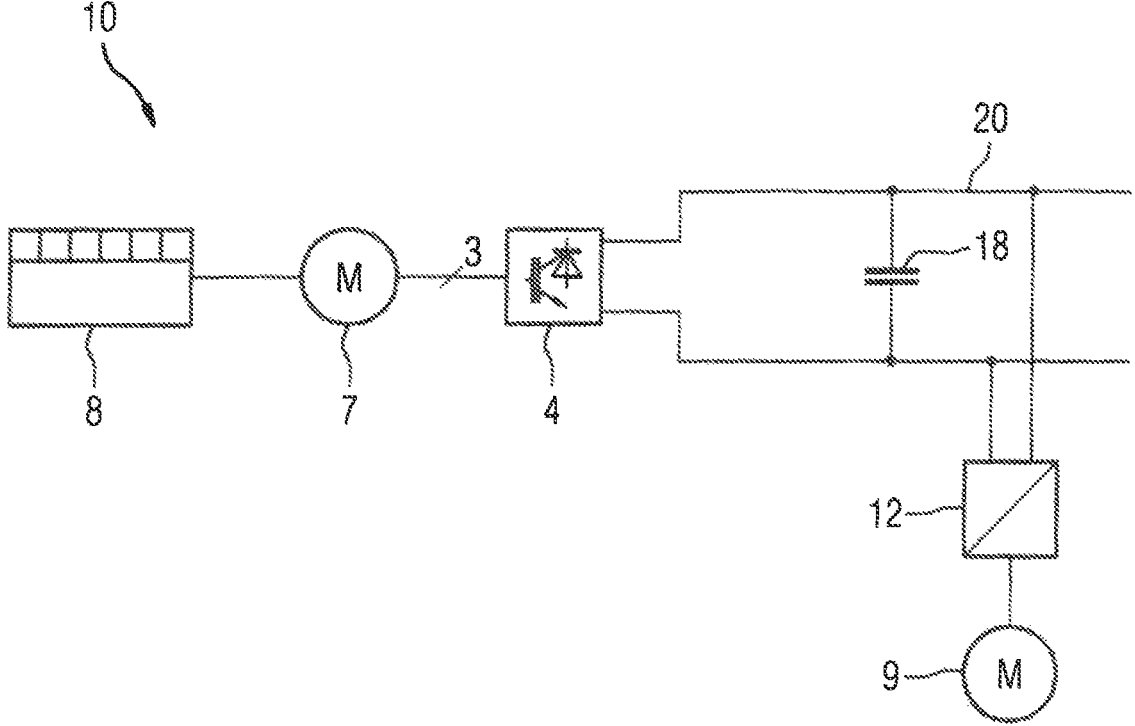
FIG. 2 shows an electrical power supply system with an active rectifier.
Figure 3:
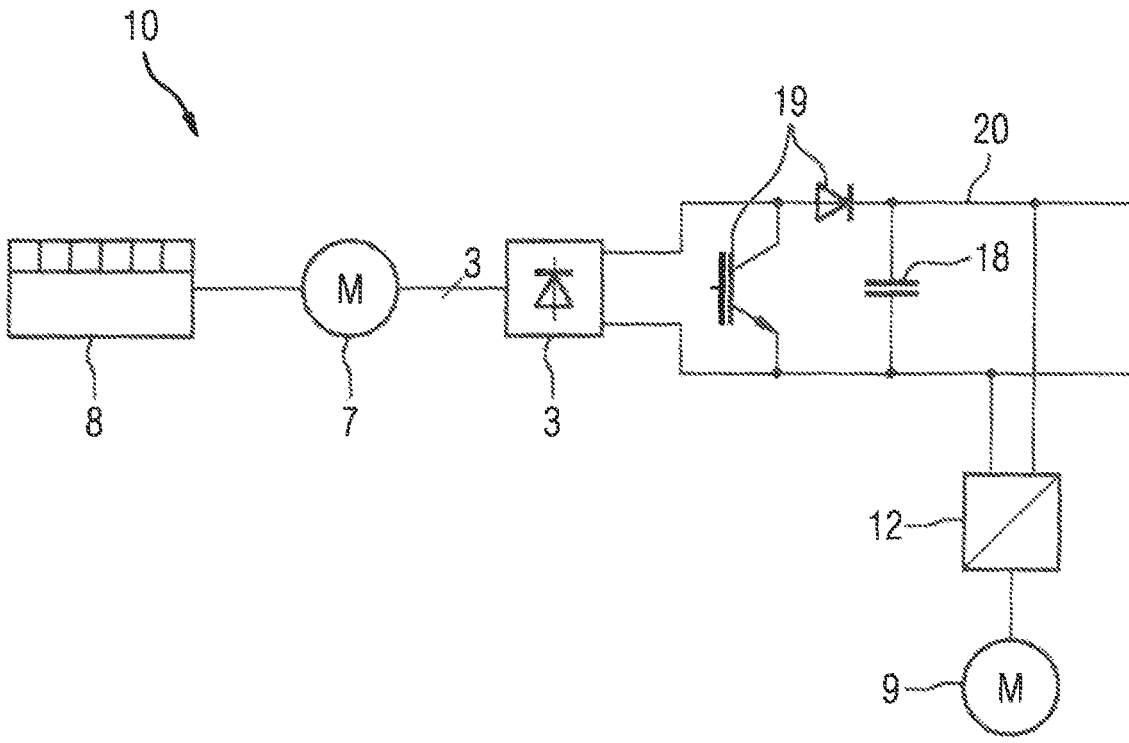
FIG. 3 shows an electrical power supply system with a passive rectifier and a boost converter.

FIG. 2 shows an electrical power supply system 20 similar to FIG. 1, wherein, in contrast to the electrical power supply system 20 according to FIG. 2 shown in FIG. 1, an active rectifier 4 is used instead of the diode rectifier as a rectifier for supplying the DC bus 20. The active rectifier 4 can comprise a conventional IGBT six-pack (rotary inverter). For example, an asynchronous/or synchronous machine can be used as generator 7.

Similarly to FIG. 1, FIG. 2 shows an electrical power supply system 20, wherein in comparison to the electrical power supply system 20 according to FIG. 2 shown in FIG. 1, a boost converter 19 is also used, in addition to the passive rectifier 3.

Figure 4:
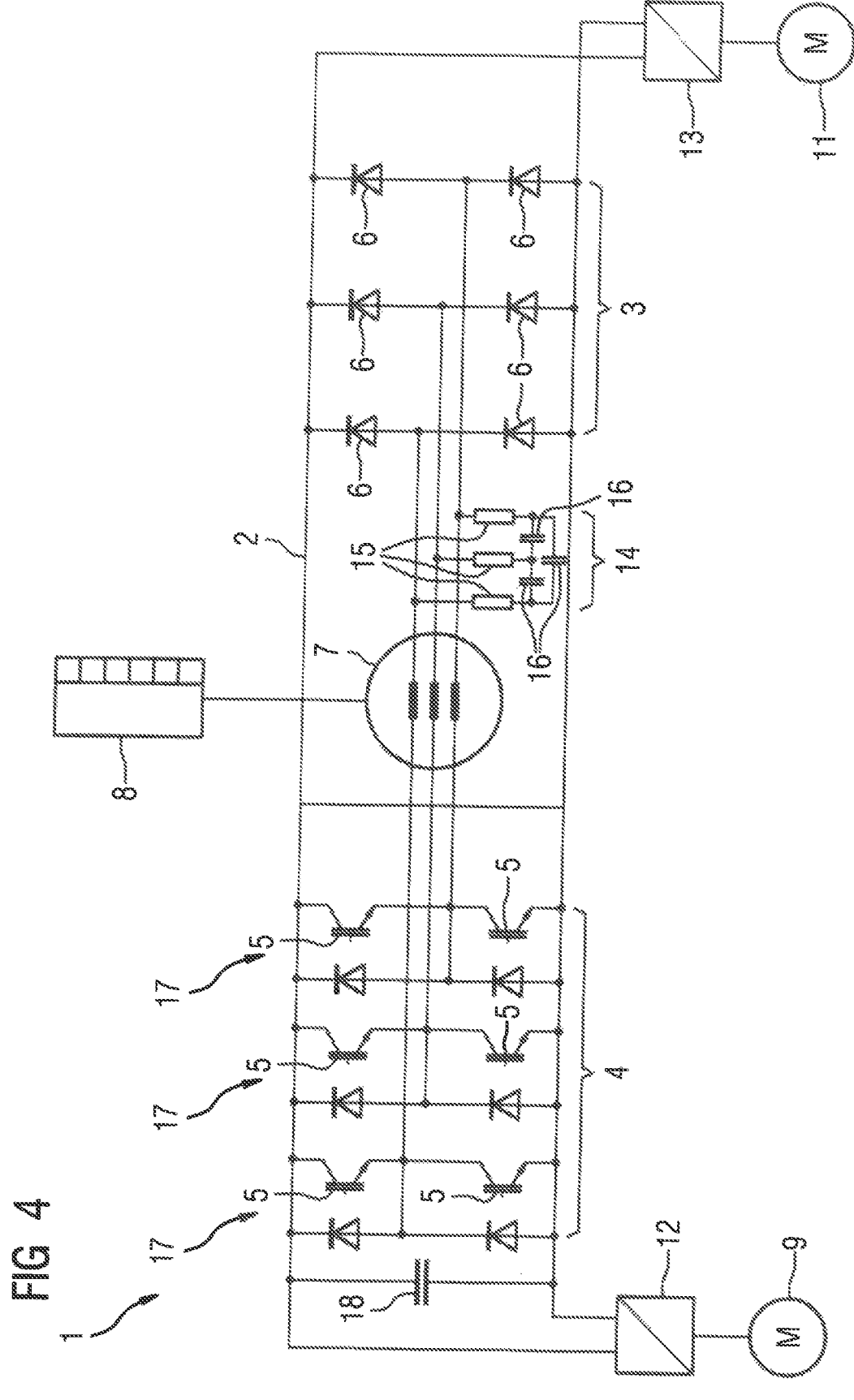
FIG. 4 shows an electrical power supply system with two rectifiers.

FIG. 4 shows an electrical power supply system 1 having two rectifiers, a first rectifier 3 and a second rectifier 4. A generator 7 is driven by a diesel engine (DM) 8. Instead of the diesel 8, a gas turbine could also be used (not shown). The generator 7 is, for example, a synchronous machine or an asynchronous machine. The generator 7 is connected in open circuit. The generator 7 supplies three-phase power to the diode rectifier 3. The diode rectifier 3, which is an uncontrolled rectifier, feeds the DC bus 2. The diode rectifier 3 comprises power semiconductor diodes 6. The generator 7 also supplies three-phase power to the second rectifier 4. The second rectifier 4 has switchable power semiconductors 5. These are distributed according to the IGBT three-phase bridge 17. Thus, as an alternative to the "conventional IGBT sixpack", which is used alone and is shown in FIG. 2, the output of the electric machine, i.e. the generator 7, is divided between two converters 3 and 4 (an IGBT sixpack and an uncontrolled rectifier). The DC bus 2 also has a capacitor 18. Inverters 12 and 13 make it possible to draw electrical energy from the DC bus 2 and drive a motor 9 or 11. The motors 9 to 11 constitute a load. At least one of the motors is used in particular to propel a ship. A filter 14 comprising resistors 15 and capacitors enables the quality of the power supplied to the first rectifier 3 to be improved. The filter 14 is electrically connected between the first rectifier 3 and the generator 7. This AC filter is optional and can also be used for additional operating point control. In the DC bus 2, DC load distribution is produced with the connected converters for e.g. propulsion and the ship electrical system. Compared to solely using a diode rectifier, the use of two rectifiers of the type described results in optimum utilization of the electrical machine and also standardization possibilities. This applies to asynchronous machines and synchronous machines (also PEM). Compared to only using one active rectifier, the use of two rectifiers of the type described can result in the following: only half the IGBT semiconductor requirement and thus only approx. 60% of the rectifier costs.

Figure 5:
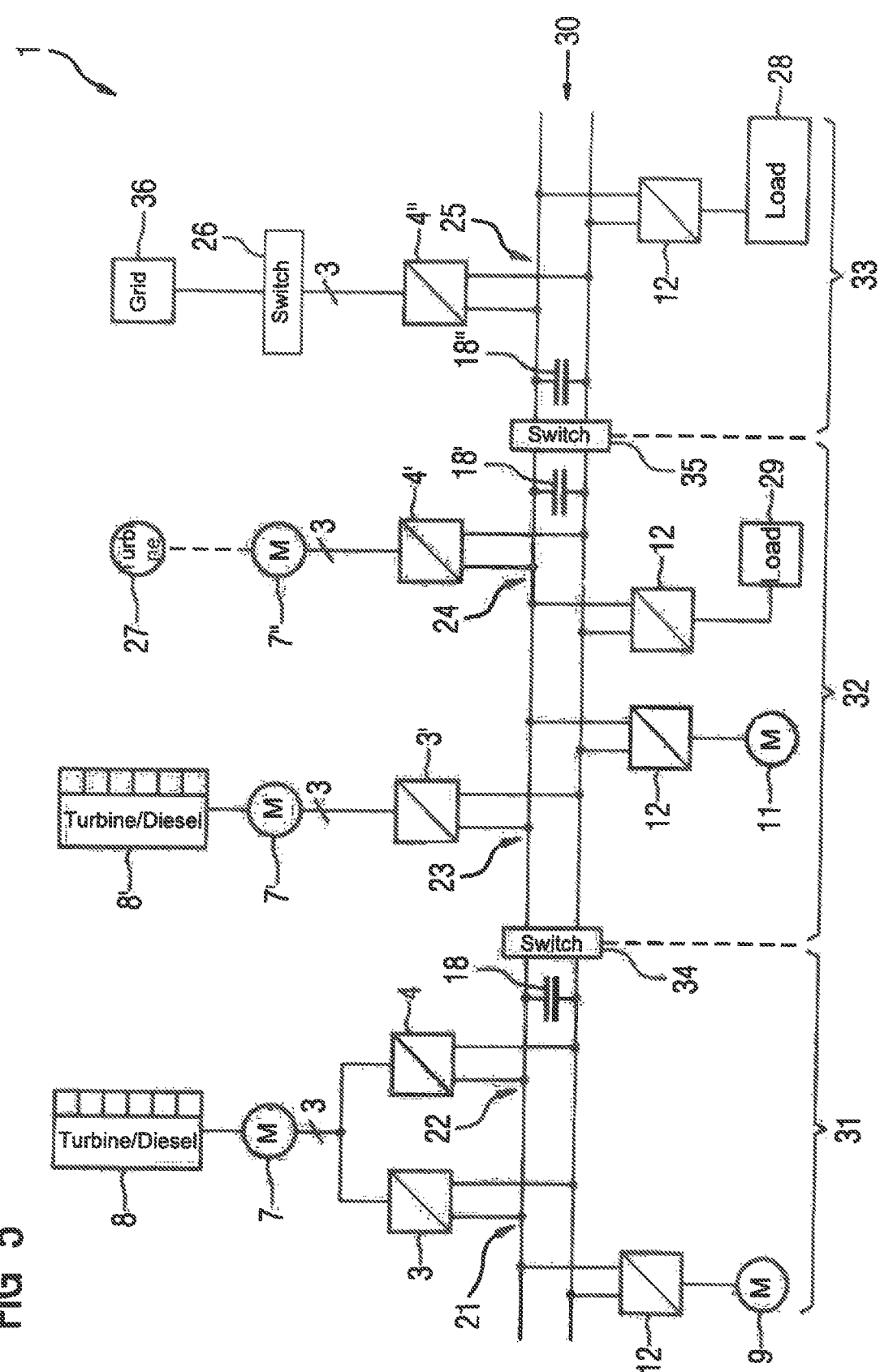
FIG. 5 shows an electrical power supply system with a DC bus which has segments.

FIG. 5 shows a DC bus 30 comprising capacitors 18, 18' and 18" which is subdivided into segments 31, 32 and 33. Loads 28, 29, 9 and 11 are connected to the DC bus 30 via inverters 12. A first segment 31 of the DC bus 30 has a first feed 21 comprising a first rectifier 3 and a second feed 22 comprising a second rectifier 4, wherein both rectifiers 3 and 4 can be supplied by means of a generator 7, wherein the generator 7 can be powered by means of a diesel 8. The second segment 32 has two feeds, namely feeds 23 and 24, wherein a rectifier 3' is associated with the feed 23 and a rectifier 4' is associated with the feed 24. The rectifier 3' is supplied by means of a generator 7', wherein the generator 7' can be powered by means of a diesel 8'. The rectifier 4' is supplied by means of a generator 7", wherein the generator 7" can be powered by means of a gas turbine 27. The third segment 33 has a feed 25, wherein a rectifier 4" is associated with the feed 25 and can be connected to an electrical grid 36 via a switch 26. The grid 36 is in particular a wide area synchronous grid (interconnection). The segments 31, 32 and 33 are segmented by means of switches 34 and 35. The segments can be electrically connected or disconnected by means of the switches 34 and 35.

The invention claimed is:

1. An electrical power supply system, comprising: a segmented DC bus including a plurality of segments, with two of the plurality of segments each include at least one feed; a first rectifier constructed as a diode rectifier, a second rectifier comprising switchable power semiconductors; and a generator designed to supply power to the first and second rectifiers for supply of power to the DC bus, wherein an output power the first rectifier is at least ⅓ of an output power of the second rectifier, and wherein the output power of the second rectifier is at least ⅓ of the output power of the first rectifier, and wherein the two segments supply different loads separately from one another.

2. The electrical power supply system of claim 1, constructed for a microgrid.

3. The electrical power supply system of claim 1, wherein one of the plurality of segments of the DC bus include only one feed designed as an external feed.

4. The electrical power supply system of claim 1, wherein the generator is a first generator for supplying power to a first one of the two segments of the DC bus, and further comprising:

a second generator for supplying power to a second one of the two segments of the DC bus, and a switch segmenting the first and the second segments.

5. The electrical power supply system of claim 1, further comprising a grid connection located distal from the electrical power supply system.

6. The electrical power supply system of claim 1, further comprising a gas turbine or a diesel driving the generator.

7. The electrical power supply system of claim 1, wherein the generator is an asynchronous machine or a synchronous machine, said generator including an open circuit.

8. The electrical power supply system of claim 1, wherein the DC bus is a DC bus of a ship, supplying power to a marine propulsion motor.

9. The electrical power supply system of claim 1, further comprising a filter disposed in an electrical connection of the generator to at least one of the first rectifier and second rectifiers.

10. The electrical power supply system of claim 1, wherein the second rectifier comprises an IGBT three-phase bridge.

11. The electrical power supply system of claim 1, wherein the DC bus comprises a capacitor.

12. A method for operating an electrical power supply system comprising a segmented DC bus which includes a plurality of segments, with at least two of the plurality of segments each including at least one feed, the method comprising:

supplying power to the segmented DC bus from a first rectifier constructed as a diode rectifier and from a second rectifier comprising switchable power semiconductors, with the first rectifier having an output power which is at least ⅓ of an output power of the second rectifier; and the output power of the second rectifier being at least ⅓ of the output power of the first rectifier, switching the first and second rectifiers at different times depending on a connected load, and activating the feeds of the at least two segments depending on the connected load.

13. The method of claim 12, further comprising supplying power via a generator to the first and second rectifiers for supply of power to the DC bus.

14. The method of claim 13, further comprising placing a filter in an electrical connection of the generator to at least one of the first rectifier and second rectifiers.

15. The method of claim 12, further comprising designing one of the plurality of segments of the DC bus with only one feed as an external feed.

16. The method of claim 12, further comprising:

supplying power to a first one of the two segments of the DC bus via a first generator;

supplying power to a second one of the two segments of the DC bus via a second generator, and segmenting the first and the second segments.

* * * * *